US007144016B2

(12) United States Patent
Gozdawa

(10) Patent No.: US 7,144,016 B2
(45) Date of Patent: Dec. 5, 2006

(54) DRY GAS SEAL

(75) Inventor: Richard Julius Gozdawa, Hillingdon (GB)

(73) Assignee: Corac Group PLC, Uxbridge Middlesex (GB)

( * ) Notice: Subject to any disclaimer, the term of this patent is extended or adjusted under 35 U.S.C. 154(b) by 0 days.

(21) Appl. No.: 10/476,395

(22) PCT Filed: Apr. 24, 2002

(86) PCT No.: PCT/GB02/01871

§ 371 (c)(1), (2), (4) Date: Jun. 21, 2004

(87) PCT Pub. No.: WO02/088578

PCT Pub. Date: Nov. 7, 2002

(65) Prior Publication Data

US 2004/0232622 A1 Nov. 25, 2004

(30) Foreign Application Priority Data

Apr. 30, 2001 (GB) ................................ 0110521.2

(51) Int. Cl.
*F16J 15/34* (2006.01)

(52) U.S. Cl. ....................... 277/399; 277/401; 277/400

(58) Field of Classification Search ................ 277/409, 277/411, 422, 400, 401, 399
See application file for complete search history.

(56) References Cited

U.S. PATENT DOCUMENTS 3,093,382 A * 6/1963 Macks ........................ 277/388
3,527,465 A * 9/1970 Guinard ...................... 277/400
3,675,935 A * 7/1972 Ludwig et al. ............. 277/400
3,695,789 A * 10/1972 Jansson ....................... 418/75
3,804,424 A * 4/1974 Gardner ...................... 277/360
4,212,475 A * 7/1980 Sedy .......................... 277/400
4,645,414 A 2/1987 DeHart et al.
5,092,612 A * 3/1992 Victor et al. ................ 277/400
5,143,384 A * 9/1992 Lipschitz .................... 277/400
5,516,118 A * 5/1996 Jones ......................... 277/400
5,702,110 A * 12/1997 Sedy .......................... 277/400
5,722,665 A * 3/1998 Sedy et al. ................. 277/400
6,135,458 A * 10/2000 Fuse .......................... 277/401
6,431,551 B1 * 8/2002 Fuse et al. .................. 277/390
6,505,836 B1 * 1/2003 Toshihiko ................... 277/400
2001/0010416 A1 * 8/2001 Wu et al. ................... 277/387

FOREIGN PATENT DOCUMENTS

GB 1 416 487 12/1975
GB 1 490 939 11/1977

* cited by examiner

*Primary Examiner*—Alison K. Pickard
(74) *Attorney, Agent, or Firm*—Jon A. Gibbons; Fleit, Kain, Gibbons, Gutman, Bongini & Bianco P.L.

(57) ABSTRACT

A gas seal assembly comprises a pair of mutually rotatable sealing members A, B, each of which has a face adjacent a gap between the two members. One of the members B is urged in a direction attempting to close the gap h which constitutes a leakage path through the seal assembly. A gas bleed arrangement 7 allows gas from a high pressure side $P_3$ of the seal assembly to bleed into the gap at a position radially spaced between an inner diameter of the members and an outer diameter of the members A,B so as to apply a force tending to separate the members, the force decreasing as the size of the gap increases.

10 Claims, 9 Drawing Sheets

Separating force
Counterbalance force
Force
0
Gap G1
Gap

Separating force
Counterbalance force

Force
Gap G2
Gap

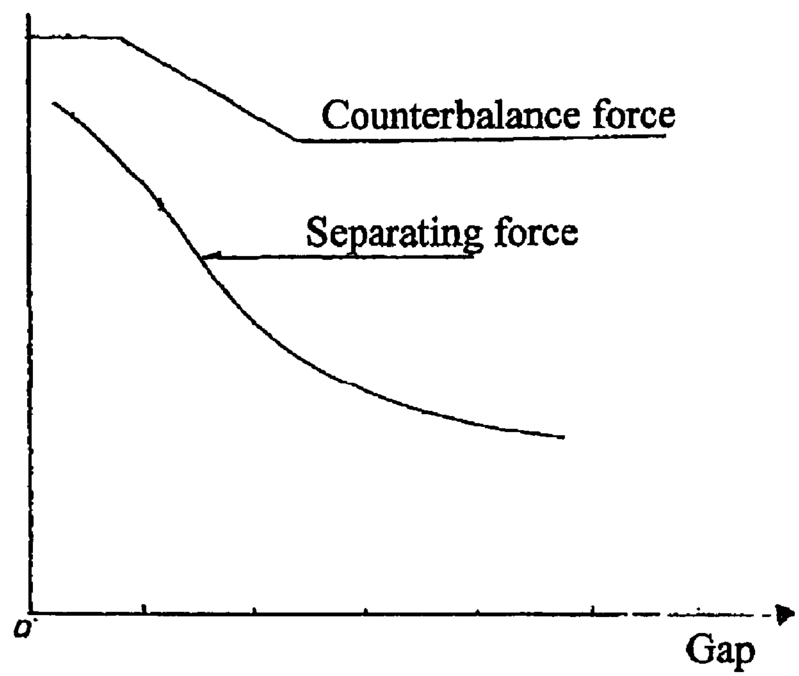
Fig. 9c
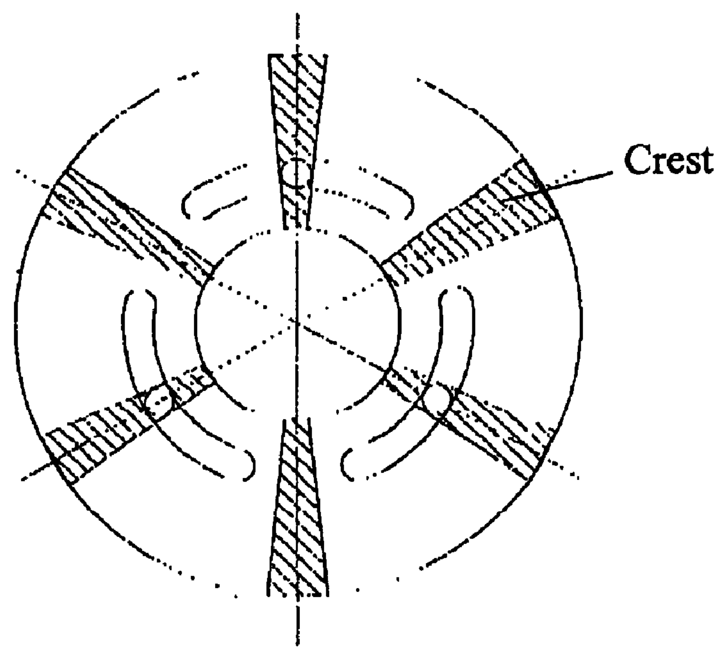
Fig. 10a
s
Fig. 10b

DRY GAS SEAL

CROSS-REFERENCE TO RELATED APPLICATIONS

This application is the National Stage of International Application No. PCT/GB02/01871 filed on Apr. 24, 2002, which is based upon and claims priority from prior British Patent Application No. 0110521.2 filed Apr. 30, 2001, the entire disclosure of which is herein incorporated by reference.

BACKGROUND OF THE INVENTION

1. Field of the Invention

This invention relates to a gas seal between two parts between which relative rotation takes place (hereinafter referred to as "mutually rotating" or "mutually rotatable" parts).

2. Description of Related Art

A dry gas seal is a gas seal the operation of which does not depend upon the supply of liquid lubricant, but which relies for lubrication upon the gas it is sealing. Dry gas seals have the advantage over liquid lubricated gas seals that there is no contamination of the gas with a lubricating liquid. This can be of particular importance in the food and pharmaceutical industries. A dry gas seal offers a further advantage over a liquid lubricated gas seal when it is used in combination with gas lubricated bearings. By lubricating both the bearings and seal with gas, rather than with lubricating oil, the conventional lubricating oil system of pump, filter and cooler that would otherwise be required can be dispensed with.

Dry gas seals are commonly used in gas compressors in the food, pharmaceutical and petroleum industries. Gases met with in the uses of dry gas seals include air, natural gas, petroleum gas, carbon dioxide and other gases of high purity, such as gases used in anaesthesia.

The above comments regarding dry gas seals, and their common applications, are not intended to limit the scope of the claimed invention. The comments are made by way of explanation only. For example, the hereinafter described and illustrated preferred embodiments of dry gas seals could be used in other applications and/or in conjunction with gases other than those mentioned above.

FIG. 1 is a schematic sectional drawing of the general arrangement of a known dry gas seal assembly. The member A is attached rigidly to the shaft 1. The member B is stationary but is free to slide axially through a casing C. Leakage between a bore in the casing and the spigot of member B is prevented by an O-ring or similar seal D. High pressure of the gas within the casing is denoted by $P_3$ and the lower outer pressure by $P_1$. The purpose of the seal is to limit to an acceptably low value the leakage from $P_3$ to $P_1$ whether the shaft is rotating or stationary. This is accomplished by arranging for the gap h which separates the active faces $F_1$ and $F_2$ of members A and B respectively to be a few micrometers only.

The member B must be free to slide axially to accommodate differential expansion between shaft 1 and casing C. Because there is no possibility of setting member B rigidly to form a gap h of a few micrometers, the gap has to be determined by the balance of the axial forces which act upon the axially free member B.

With reference to FIG. 1, the counterbalance forces which act upon member B from right to left are the force of the pressure $P_3$ acting upon the annular back face F3 of the member B, the force of pressure $P_1$ acting upon the annular face $F_4$, the force of the compression springs at E and a small friction force of indeterminate sign arising from the seal D and also from the means (not shown) used to prevent member B from rotating. The pressure forces do not vary with the axial position of member B and over the few millimetres of axial movement of member B the force of the compression springs B is essentially constant. The outcome is that the counterbalance force acting upon member B from right to left is essentially independent of the axial position of member B and must lie within a narrow band whose width is determined by the friction force of indeterminate sign.

The necessary condition for the gap h to have a specified value in the operation of a seal is illustrated by FIG. 2 in which the separating force acting upon member B from left to right is illustrated by the sloping line 5. The counterbalance force acting on member B from right to left is represented by line 2 or by line 3 in dependence upon the sign of the friction forces whose double magnitude is represented by the separation 4 of lines 2 and 3. These forces are plotted illustratively against the gap h. The specified value of gap h is determined by the intersection of the sloping line 5 with either line 2 or line 3 in dependence upon the direction in which the friction force is acting. It is closer to reality to consider the width 4 to be a band of uncertainty so that all that is specified is that h lies somewhere between the values of h given by the intersection of line 5 with lines 2 and 3. For an intersection to exist, the separating force acting on member B must depend upon the gap h and for gap h to be set stably the separating force must fall as the gap h increases. The enabling matter in the production of a working dry gas seal is the arranging of a separating force which decreases as the gap h increases. But for that arrangement the faces of members A and B would be in dry contact and would be damaged on rotation of the shaft 1 of FIG. 1.

At values of gap h of a few micrometers, the leakage flow of the gas between the active faces $F_1$ and $F_2$ Of FIG. 1 is viscous in nature. Ultimately as gap h is increased viscous flow changes to turbulent flow. Whilst viscous flow persists, and here for simplicity the faces $F_{1\ and\ F2}$ of FIG. 1 will be taken as being plane parallel, then the way in which the pressure in the gap falls from $P_3$ at $R_3$ to $P_1$ at $R_1$ is independent of the gap h. The continuous line 6 in FIG. 4 illustrates the pressure distribution in the gap h of that condition. The separating force acting upon the member B from left to right is the area integral of the pressure distribution over the active face of member B from $R_3$ to $R_1$.

If the pressure distribution does not change with gap h, it follows that the separating force does not change with gap h. Then there can be no intersection of the separating and counterbalance forces as has been shown to be essential and as is illustrated in FIG. 2. Consequently, the sealing surfaces of the FIG. 1 seal would not in practice, provide a dry gas seal. There has to be an elaboration of the flow between plane faces to produce a separating force which falls as gap h increases.

SUMMARY OF THE INVENTION

According to a first aspect of the present invention there is provided a gas seal assembly comprising a pair of mutually rotatable sealing members, each of which has a face adjacent a gap between the two members, one of the members being arranged in use to be urged in a direction attempting to close the gap which constitutes a leakage path through the seal assembly, further comprising a gas bleed arrangement for allowing gas from a high pressure side of the seal to be admitted into the gap at a position radially between inner and outer diameters of the members, the gas pressure in the gap applying a force in a direction to increase the separation of the two members, characterised in that the bleed arrangement comprises a channel having an associated flow resistance which is dimensioned such that the gas pressure at the gap end of the channel is reduced relative to the pressure at the high pressure side of the seal assembly and such that the gas pressure in the gap decreases as the size of the gap increases.

In dry gas seal assemblies of the type discussed generally above, it is possible that the sealing surfaces become, in use, other than parallel to each other. It will be appreciated that such lack of parallel is undesirable. It is desirable, that inclination between the faces of the mutually rotating members should cause a moment which tends to return the faces to their parallel condition. It is a further feature of the invention, therefore, to provide a dry gas seal assembly wherein upon departure from a parallel condition a moment is produced tending to restore that parallel condition.

According to a second aspect of the present invention there is provided a dry gas seal assembly comprising a pair of mutually rotatable sealing members, each of which has a front face adjacent a gap between the two members, the front face of at least one the member being provided with at least three pressure distributions formations each separately connectable via a bleed channel with a high pressure region on one side of the seal assembly so that in the event that the face of the two members become non-parallel in use a force will be generated tending to return the faces to their parallel condition.

According to a third aspect of the present invention there is provided a dry gas seal assembly comprising a pair of mutually rotatable sealing members, each of which has a front face adjacent a gap between the two members, one of the members being arranged in use to be urged in a direction tending to close the gap which constitutes a leakage path through the seal assembly, wherein one of the faces defining the gap is provided with a circumferential undulation which is so constructed and arranged that, upon mutual rotation of the sealing members, a force is generated tending to separate the members, the magnitude of the force being dependent upon the speed of mutual rotation of the sealing members.

As will be apparent from the following description and drawings, each of these different aspects of the present invention may be used in conjunction with any other aspect of the present invention, in a single seal assembly.

BRIEF DESCRIPTION OF THE DRAWINGS

The invention will now be described further, by way of example, with reference to the accompanying drawings, in which:

FIG. 9*a*, FIG. 9*b* and FIG. 9*c* represent a series of graphs, similar to FIG. 5, showing how the relationship between the separating force and the counterbalance force changes as the operating conditions of the seal assembly vary;

FIG. 10*a* shows the front face of a member generally similar to that in FIG. 6*a*, but additionally provided on its front surface with a circumferential undulation having six crests;

FIG. 10*b* is a side elevation of the member of FIG. 10*a*, showing the circumferential undulation in the front surface of the member;

DETAILED DESCRIPTION OF PREFERRED EMBODIMENTS

It is convenient here to describe in general terms the means of creating a separating force which falls as gap h increases.

Figure 1:
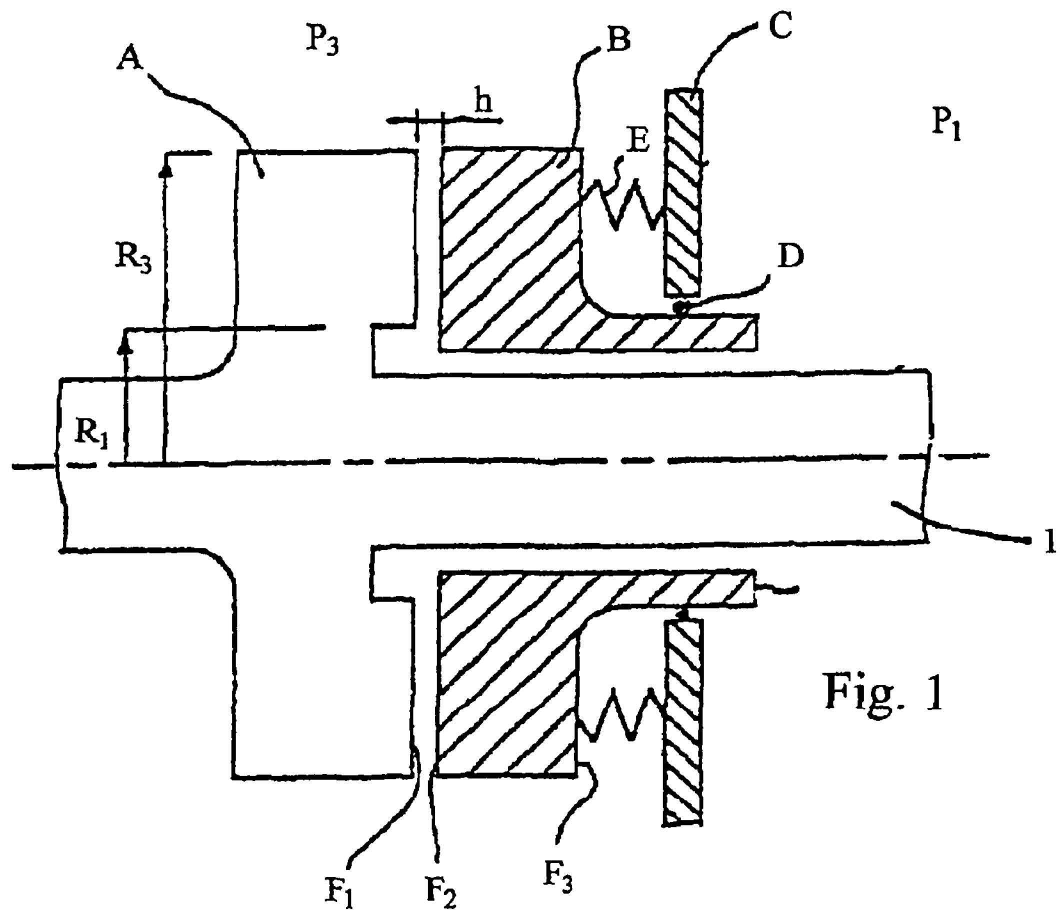
FIG. 1 is a schematic sectional drawing of the general arrangement of a known dry gas seal assembly.
Figure 3:
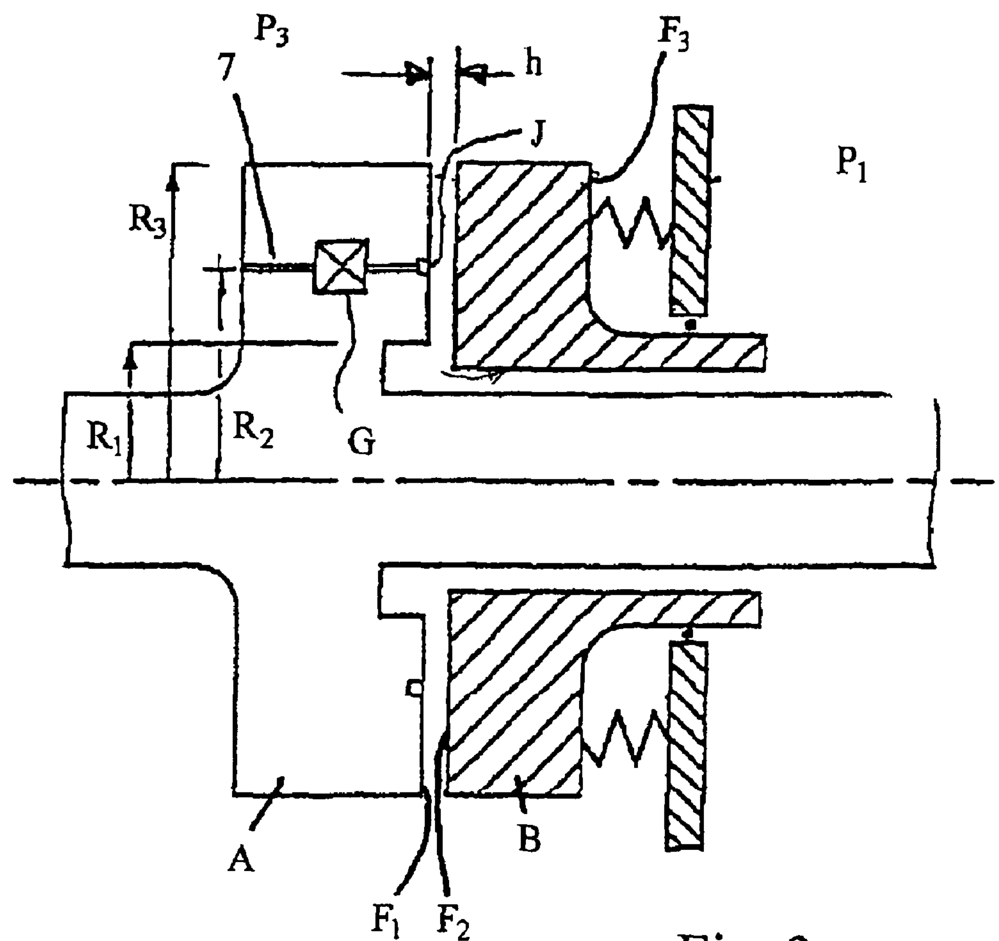
FIG. 3 shows a first embodiment of a seal assembly according to the present invention.

FIG. 3, which illustrates a first embodiment of a seal assembly of the invention, is similar to FIG. 1, but with the addition, for illustrative purposes, of three or more arcuate, discontinuous distribution grooves J at radius R2, in the active face F1 of the member A and with the addition for illustrative purposes of a bleed channel 7 and an inline bleed flow throttle or resistance G associated with each arcuate groove J and which puts each groove J into communication with the high pressure P3 within the casing. In terms of physical principles, the distribution grooves J, channels 7 and the bleed resistances G might equally well be features of the stationary member B.

The significance of the distribution grooves J is to denote that the pressure on the concentric circle of radius $R_2$ is constant, but only when the faces $F_1$ and $F_2$ are parallel. The pressures must become unequal when the faces are not parallel in order to produce the moment.

Figure 4:
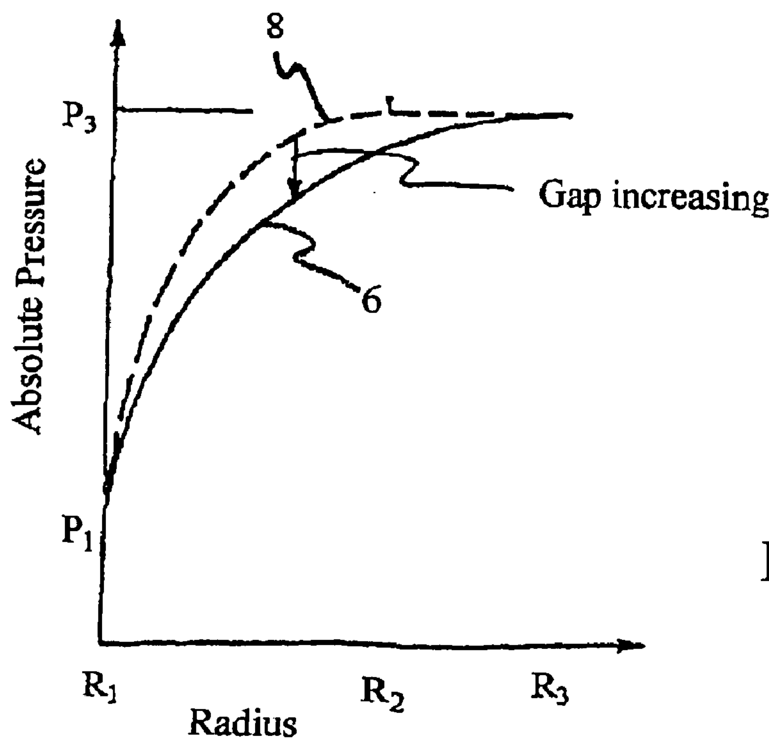
FIG. 4 is a graph showing the pressure in the gap between a pair of members of a seal assembly as a function of radius and showing how the pressure varies as the width of the gap is increased.
Figure 5:
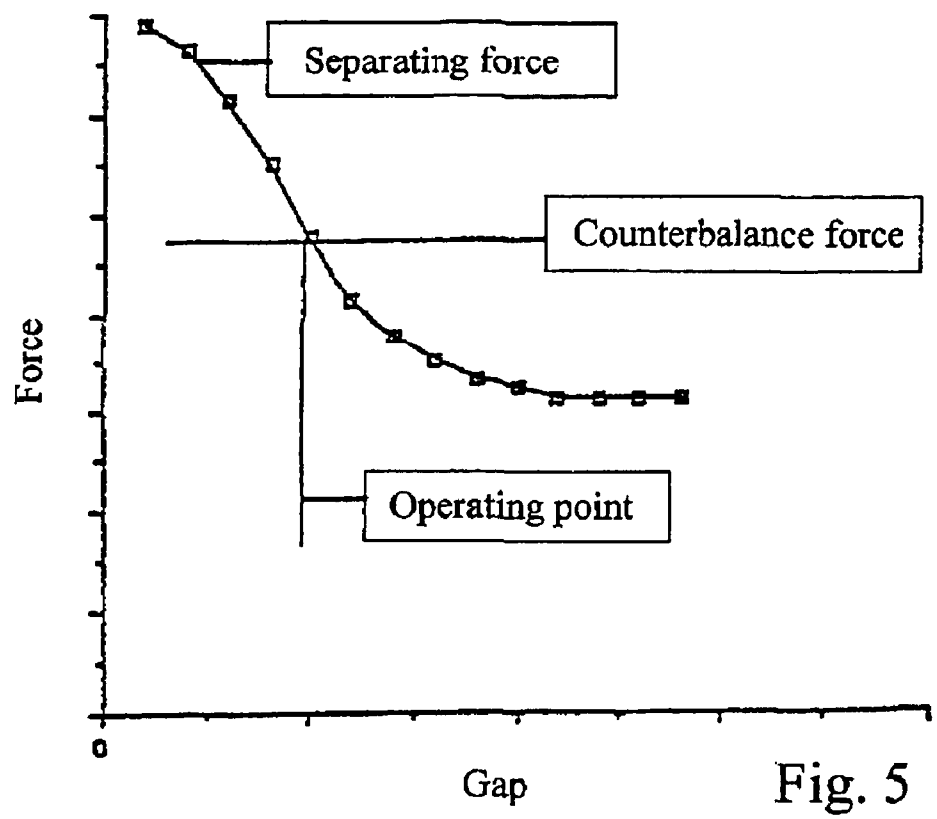
FIG. 5 is a graph illustrating the relationship between the separating force and the counterbalance force in the arrangement of FIG. 3.

Two extreme conditions will now be considered with reference to FIG. 4. In the first extreme, the gap h in FIG. 3 is so small that the flow resistance through the gap h is large in comparison with the flow resistance through the bleed resistance G. Then the pressures in the gap h at $R_3$ and at $R_2$ are both essentially equal to $P_3$ and in essence all of the pressure drop from $P_3$ to $P_1$ within the gap h occurs within the radial interval $R_2$ to $R_1$. This pressure distribution in gap h is shown illustratively by the dashed line 8 in FIG. 4. In the second extreme, the gap h has increased to a point where the flow resistance through the gap h is small in comparison with the flow resistance of the bleed resistance G. Then as gap h increases the flow through the bleed resistance G becomes progressively less relevant and the pressure distribution approaches asymptotically the distribution of the continuous line 6 in FIG. 4. As described previously that continuous line 6 pertains to unelaborated plane faces and is independent of h. By the provision of the groove J, the bleed channel 7 and bleed flow resistance G a pressure distribution is thus created which varies with the gap h. It follows that those provisions also create a separating force which falls as the gap h increases and thereby satisfies the enabling requirement illustrated by FIG. 2. FIG. 5 illustrates the effect of the bleed upon separating force as a function of the gap h.

It is this monotonic reduction in separating force as the gap h increases (and the concomitant increase in separating force as the gap reduces) that is elsewhere in this specification referred to as the separating force varying "inversely" with the size of the gap. The term "inverse" is not being used in the context of a precise mathematical relationship of the force varying in strict proportion to the reciprocal of the gap.

The bleed of gas to groove J, via the channel 7 and flow resistance G, is a flow additional to that which would otherwise leak between the plane $F_1$, $F_2$.

It cannot, in practice, be assumed that the active faces Fl and $F_2$ of the FIG. 1 arrangement will be parallel and it is desirable that any inclination of one to the other should invoke a restoring moment.

Figure 6A:
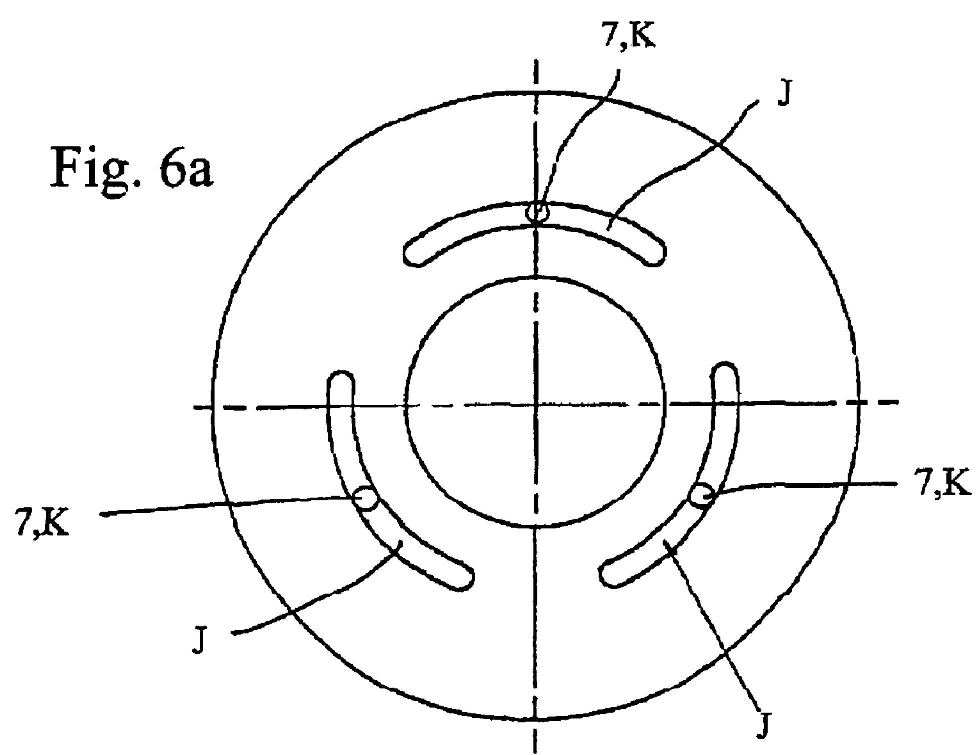
FIG. 6*a* shows the front face of a member of the first embodiment of FIG. 3 or the second embodiment of FIG. 7.

A restoring moment can be created by establishing in the gap h three or more arcuate sectors each of which responds to some weighted value of gap h over its sector. FIG. 6*a* is a plan view of the active face $F_1$ of the member A of FIG. 3, showing three distribution grooves J formed therein, rather than a single continuous 360° groove. Each groove J is in communication with the high pressure $P_3$ via a channel 7 and then via equal bleed resistances G. The three distribution grooves J are capable of sustaining unequal pressures and divide the face $F_1$ into three sectors. The pressures in the grooves J respond in an inverse fashion to the weighted average value of gap h over the sectors and cause the axial separating force or each sector also to respond in an inverse fashion. In that way an inclination of the faces $F_1$ and $F_2$ of members A and B one to another is caused to invoke a restoring moment.

What is described in conjunction with FIG. 6*a* is the formation in the active face of either the rotating member A of FIG. 3 or in the stationary member B of FIG. 3 of a number, equal to or exceeding three, of equal and equally disposed distribution grooves J with each distribution groove J put into communication with the high pressure $P_3$ within the casing via an equal bleed resistance of appropriate value and of any practicable physical form.

Figure 6B:
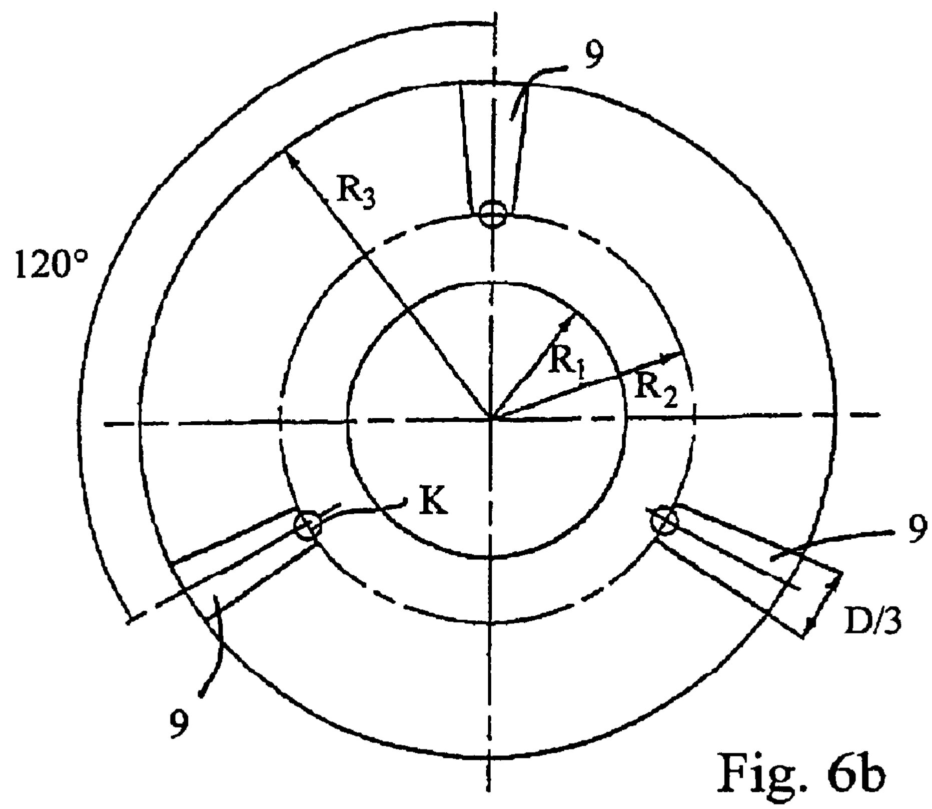
FIG. 6*b* illustrated a rear view of the member of FIG. 6*a* in the context of the second embodiment of FIG. 7.
Figure 7:
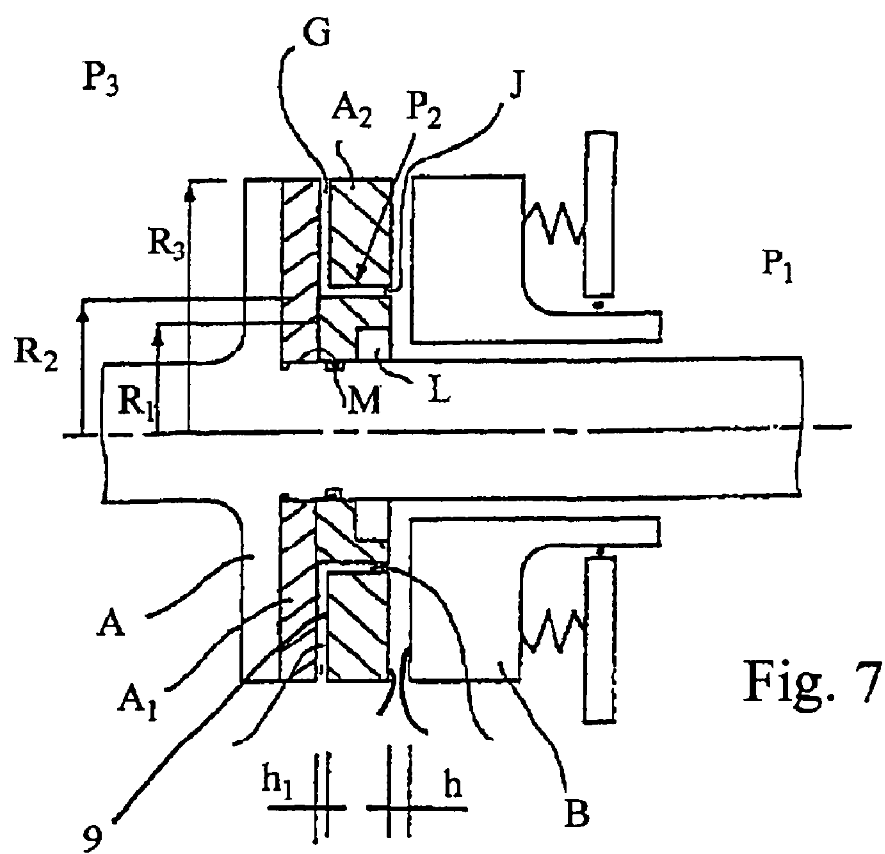
FIG. 7 shows a second embodiment of seal assembly according to the present invention.

FIG. 7 is a cross-section of a second embodiment of a seal assembly. The rotating member A is elaborated in FIG. 7 with the annular members $A_1$ and $A_2$. The faces of both members are parallel. Both faces of member $A_2$ are lapped flat, as also is the right hand face of member $A_1$. The facing faces of members $A_1$ and $A_2$ are held in contact by a screwed ring L. Leakage past the right hand surface of the flange A and the left hand surface of the member $A_1$ is stopped by a seal M. The member $A_2$ has formed in it distribution grooves as indicated at J and communicating holes as indicated at K, as described with reference to FIG. 6*a*. A bleed resistance or throttle referenced G in FIG. 7, comprises a generally radial depression 9 of depth $h_1$ etched or otherwise produced in either the right hand face of member $A_1$ or in the left hand face of member $A_2$. The plan of such a depression 9 is illustrated in FIG. 6*b*. One such depression 9 is provided in alignment with each of the communicating holes K.

Attributes of this second embodiment include an insensitivity to uniform wear of the active faces $F_1$ and $F_2$ and that for a desired value of bleed resistance in total the small number of depressions 9 which are demanded allows a greater value for the depression depth $h_1$ than a greater number of depressions would permit. In consequence the depressions of small number are less prone to blockage by particulate matter. Furthermore in comparison with another embodiment which follows below (and with other things equal), the bleed resistances are unaffected by wear of the active faces $F_1$ and $F_2$ at which relative rotation occurs and the bleed value of the resistances is constant and independent of the gap h between the active faces. With other things equal, the effect or this is to cause the separating force to fall more sharply as the gap h increases.

Figure 8A:
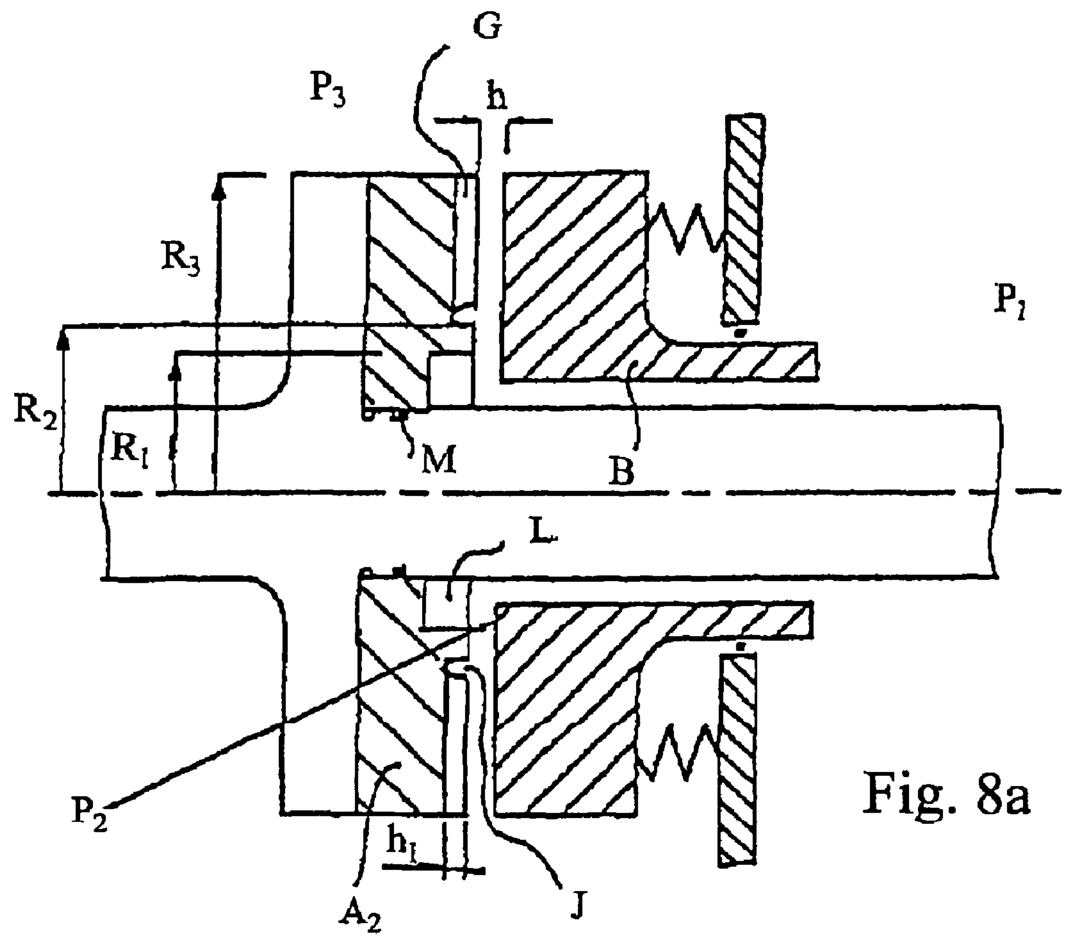
FIG. 8*a* shows a third embodiment of seal assembly according to the present invention.

FIG. 8*a*, which is generally a repetition of FIG. 7, illustrates a third embodiment of a seal assembly of the invention in which the bleed resistances G are formed in the right hand face of member $A_2$ and take the form of a single depression per distribution groove J. In this embodiment the bleed resistances decrease as gap h increases because their effective depth is depression depth $h_1$ plus gap h. Detritus from wear of the active faces might accumulate in the depressions of the bleed resistances and alter their value and furthermore wear of the right hand face of member $A_2$ will reduce the value of $h_1$ and if the wear should progress sufficiently the bleed resistances would be removed. A positive attribute of this embodiment is the absence of the member $A_1$ of FIG. 7 and a simpler manufacture.

The principle which has been described of bleed resistances communicating with the high pressure side to distribution grooves in one or other of the active faces of a seal applies equally if the pressure $P_1$ of FIG. 1 is the high pressure and the pressure $P_3$ of FIG. 1 is the low pressure. Changes in detailed design are then required but the principle of operation of the seal remains.

The invention is not limited to the precise details of the foregoing. For example, the actual separation force across the seal can be used independently of the invention described in relation to FIG. 6 in which a lack of axial alignment causes a restoring force. Of course, these two features can be used together if desired.

The formations can be provided in the stationary or the non-rotating part of the seal assembly. Of course, the seal assembly can be equally applicable to a pair of members which are both rotating, although one is rotating faster or in the opposite direction to the other so that there is still mutual rotation between the two parts.

In the above described embodiments of a seal assembly of the invention, the determination of the gap at the design point of the seal is illustrated in FIG. 5. Within the circumstances in which dry gas seals operate, where a bleed is provided as in the above described and illustrated seal assemblies, the separating force reduces as the gap h between the active faces increases.

Figure 2:
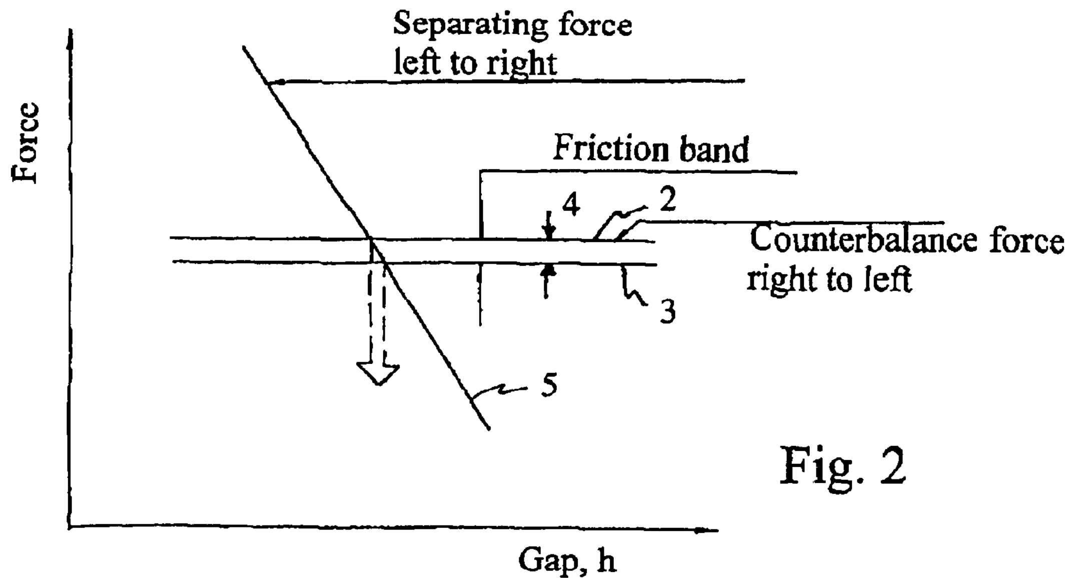
FIG. 2 is a graph illustrating the requirement for the provision of a suitable practically operating seal assembly.

FIGS. 2, 4 and 5 above pertain to the operating point of the above described and illustrated seal assemblies when the pressure $P_3$ has reached its design operating value.

Figure 9A:
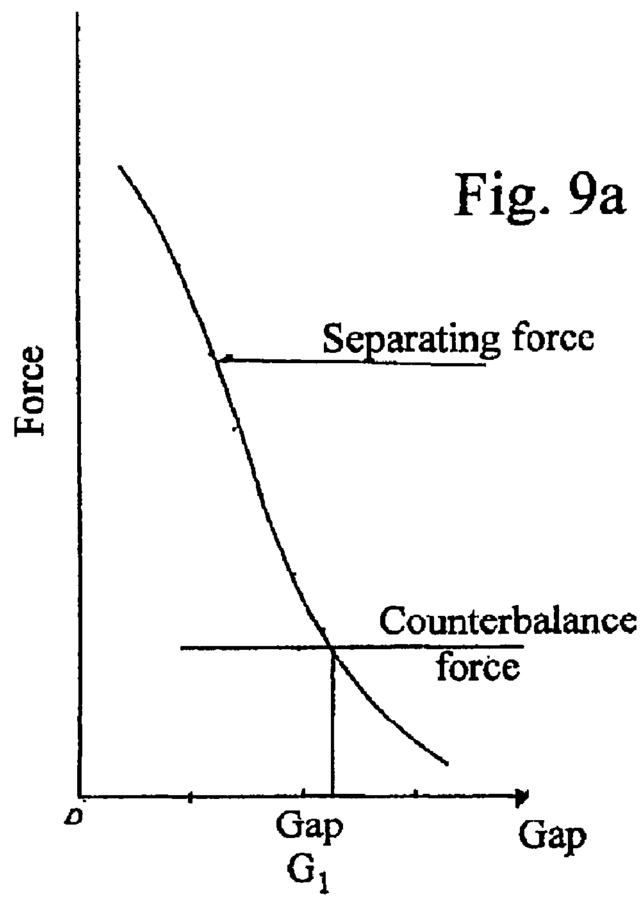
Figure 9B:
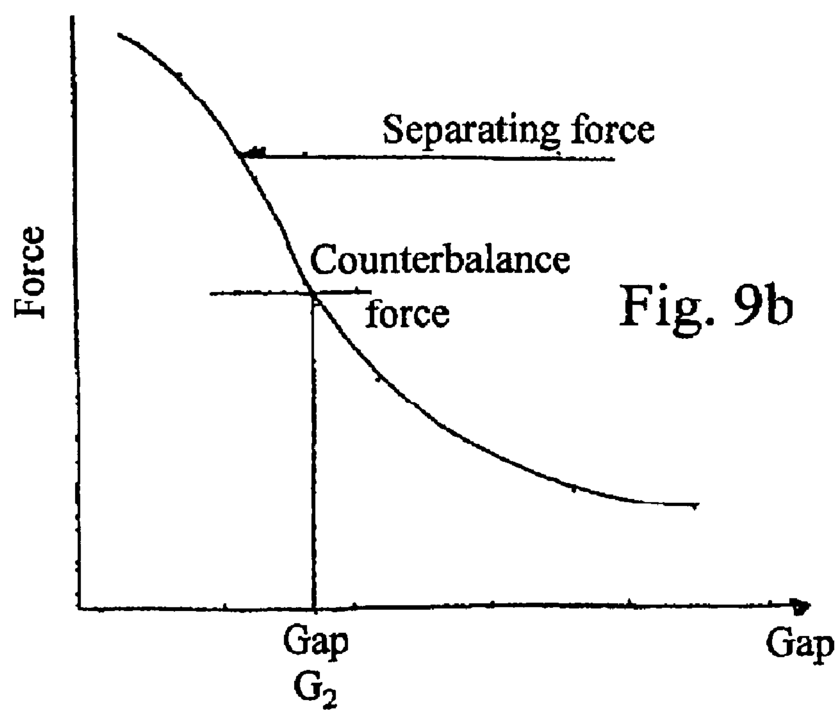

The series of FIGS. 9*a*, 9*b* and 9*c*, illustrate a range of conditions. FIG. 9*a* pertains to the operating point of a seal where the pressure $P_3$ has reached its design operating value. FIG. 9*b* represents the condition where the pressure upstream of the seal is only 75% of the design pressure $P_3$. FIG. 9*c* represents the condition where the upstream pressure is only 10% of the design pressure $P_3$.

In the FIG. 9*b* condition there will still be a gap between the active surfaces of the seal assembly, but this gap is at a value $G_2$ which is less than the gap value $G_1$ at the counterbalance force/separating force intersection in FIG. 9*a*.

Nevertheless, in the FIG. 9*b* condition there will still be a gap, albeit reduced, between the active surfaces.

In the FIG. 9*c* condition, however, it can be seen that there is no intersection between the counterbalance force line and the separating force line. Consequently, in this condition there will be no gap between the described and illustrated seal assemblies with the result that the active surfaces will be in contact. The graphs of FIGS. 9*a*–9*c* show what can happen with the embodiments of FIGS. 3, 7 and B when running below design values.

In FIGS. 9*a*, 9*b* and 9*c*, the force scales have false origins and have different scaling factors. Nevertheless, the general trend is apparent that as pressure $P_3$ falls the intersection of the counterbalance force with the curve of the separating force moves progressively so as to provide a smaller gap between the active surfaces until there is eventually no gap.

The hereinafter described and illustrated embodiments of a seal assembly of the invention are concerned with giving protection to the seal assembly when operating with a pressure $P_3$ below the design operating value. The gap between the active faces of a prior art seal is a function of the pressures $P_1$ and $P_3$ and is for all practical purposes independent of rotational speed.

FIGS. 9*c* to 9*a* (in that order) may be regarded as generally illustrative of the condition of a gas compressor seal as the compressor is started up and its speed increased up towards it design operating speed. From initial start-up to somewhat above one third of full speed, there will be no gap between the opposing active surfaces, which surfaces will be in contact.

Typically, the rotating member of a gas seal has a very hard ceramic surface, whilst the stationary member is made of graphite. With such a combination, the seal is able to resist transient contact of the surfaces at low speed without significant damage, whilst the compressor is being brought up to speed. Because, however, a gap is a matter of pressure and not of speed, the transient contact will not occur frequently even though the compressor may be stopped or slowed frequently in operation. Provided that the casing of the compressor and seal remain subject to a high pressure maintained in the receiver of the compressor, there should be no contact.

The hereinafter described and illustrated arrangements mitigate the potential seal active surface contact problems noted above by providing a speed dependent increment in the active surface separating force. By way of illustration, if one takes the situation shown in FIG. 9*c*, providing a sufficient speed dependent increment in the separating force would raise the separating force curve from the position shown in FIG. 9*c* so that this curve intersects with the counterbalance force to provide a finite gap between the active seal surfaces. More generally, adding a significant speed dependent increment to the separating force will provide a finite gap at a lower speed of rotation than would otherwise be the case. This speed dependent increment will be significant when the pressure upstream of the seal is small, as in the situation represented by FIG. 9*c*, but it will become progressively less significant as the upstream pressure rises, to become insignificant when the upstream pressure is the high design operating pressure represented in FIG. 9*a*.

To provide a significant speed dependent increment in the separating force, one of the active surfaces of the seal assembly is provided with a circumferential undulation.

Before going on to disclose how this might be applied to a seal assembly of the invention, a brief background explanation might be useful. When one has two annular plates with flat faces, for example as with the contact plates in a vehicle clutch, the plates have a common axis and one plate is rotated whilst the other is stationary. When the faces mate, the lubricant between the plates is expressed and the plates slide against each other in dry contact. If, however, one were to provide the surface of one of the plates with a circumferential undulation, then these surfaces would not mate. Some lubricant would be retained between the surfaces. Furthermore, the relative motion between the plates would generate pressures tending to separate the plates as lubricant is dragged over the crests of the undulations. This would apply even when the lubricant is gas. This general principle is employed in the following arrangements.

In the context of the embodiments of a seal assembly of the invention discussed above, providing a precautionary measure for ameliorating contact could, in one arrangement, involve taking the member illustrated in FIG. 6*a* and providing on its front surface $F_1$ (the same active surface provided with distribution groove J) a circumferential undulation, for example having an amplitude of 3 micrometers, providing an undulation depth (referenced S in FIG. 10*b*) from crest to trough of 6 micrometers. In the FIGS. 3 and 7 embodiments, for example, modifying the member of FIG. 6*a* in the above discussed manner would result in the right hand (or front) face $F_1$ being provided with the circumferential undulation. FIG. 10*a* is a plan view, generally similar to that of FIG. 6*a*, additionally showing the front (active) surface $F_1$ of the member as being provided with a circumferential undulation. The cross hatched areas of FIG. 10*a* denote the crests or peaks of the undulations. In FIG. 10*b*, which is a side elevation of the member of FIG. 10*a*, the undulations are exaggerated for reasons of clarity. Upon rotation of the members on which the surface $F_1$ is provided in the FIG. 3 or 7 embodiment, the provision of undulations in the face $F_1$ will produce a self-generated increment to the separating force. The undulations will not be entirely in addition to the gap under the conditions that a uniform finite gap would otherwise exist, but will be partly subsumed within the gap. Consequently, the increase in leakage arising from the provision of the undulations becomes less proportionally as the pressure across the seal increases.

Instead of being provided with smooth undulations as in FIG. 10, the face of a plate may instead be provided with undulations in the form of discrete sharp shallow depressions of small arcuate width, as will be explained later.

Figure 8B:
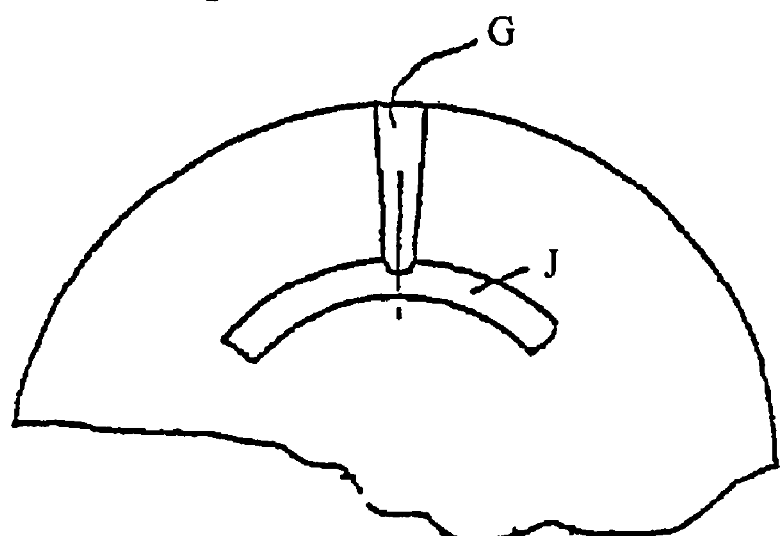
FIG. 8*b* shows part of the front face of a member of the embodiment of FIG. 8*a;*
Figure 11:
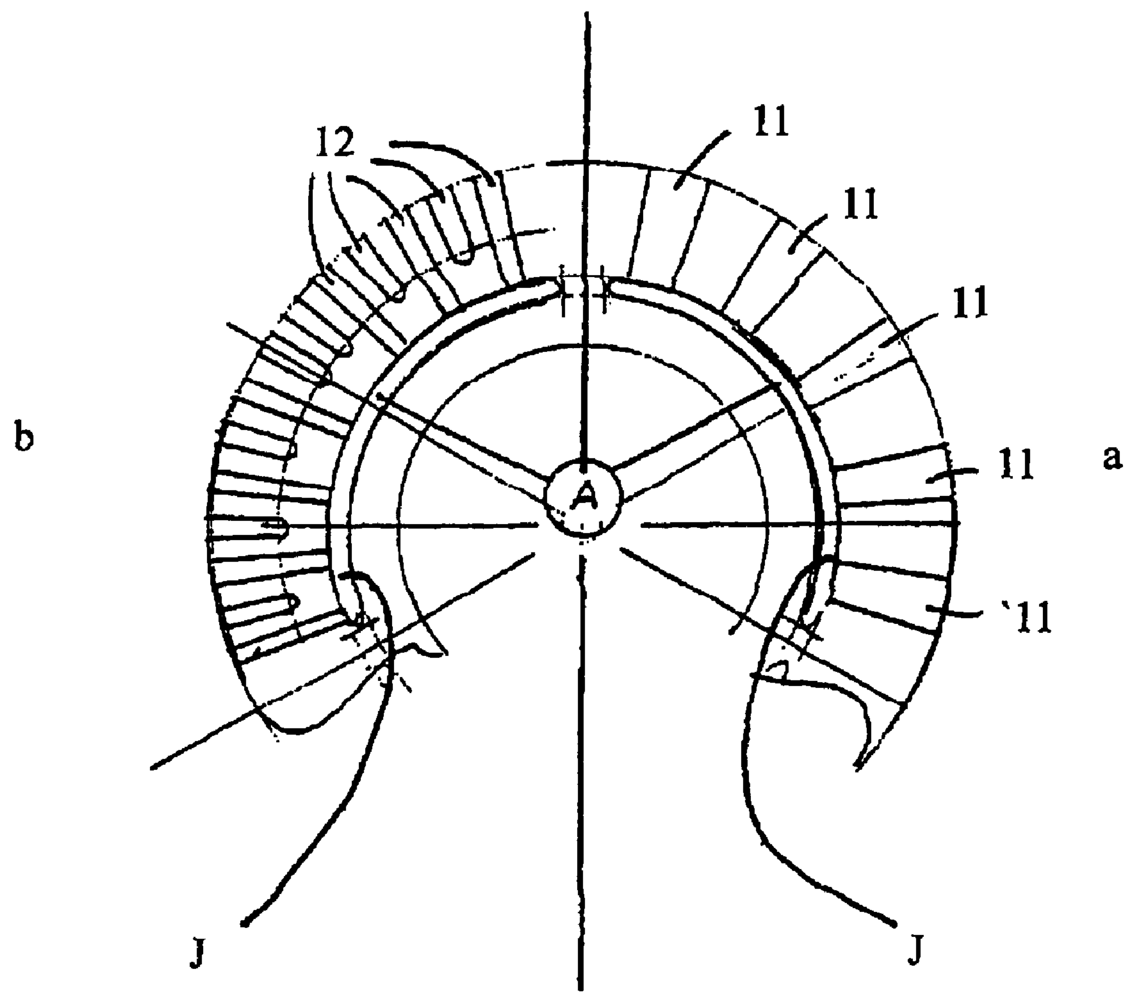
FIG. 11 shows the front face of a modified member of the seal assembly of FIG. 8, the left and right hand halves of FIG. 11 showing different variants of modification.

To modify the FIG. 8 arrangement to provide it with a precautionary measure for ameliorating the contact problem discussed above, the preferred means would be to replace the single depressions per arcuate distribution groove J forming the bleed resistances G in the right hand (front) face of the member $A_2$ with a multiplicity of channels, for example as shown by the reference numeral 11 in the right hand half of FIG. 11. Although the single depressions forming the bleed resistances G in the unmodified FIG. 8 arrangement will themselves produce a self generated increment to the separating force, that effect can be enhanced by the provision of a plurality of channels 11 per distribution groove J, which channels will be less deep if the seal is to retain the same leakage rate. These channels 11 might readily be produced by etching. Although the channels 11 illustrated in the right hand half of FIG. 11 as running between the distribution groove J and the circumferential extremity of the member, which replace the deeper depression forming the bleed resistance G in the FIG. 8 arrangement, occupy a greater arc than the deeper radially extending groove in the FIG. B arrangement, the total flow resistance is kept substantially the same because of the reduced depth of the channels 11 in the right hand half of FIG. 11 relative to the single depression G per distribution groove J illustrated in FIG. 8*b*.

By way of explanation, if the plate illustrated in the right hand half of FIG. 11 were to be in contact with the opposing acting surface of the seal assembly, such that the channels 11 in the right hand half of FIG. 11 became the only means of gas flowing through the periphery of the member into the arcuate distribution groove J, then with other things being equal, the volume flow through a channel is proportional to the cube of its depth, multiplied by its angular width. The significance of this is that a relatively small decrease in depth of a depression allows for a considerably greater angular width to be employed for the reduced depth depression whilst leaving the flow therethrough unaffected. Thus, if the single depression running to the distribution groove J illustrated in FIG. 8*b* were to be 10 micrometers in depth, and the depth of the replacement, reduced depth channels 11 illustrated in the right hand half of FIG. 11 were to be of 6 microns in depth, then for the same flow, the reduced depth channels 11 can occupy in total an arc of approximately 5 times the arc occupied by the single, deeper radial depression forming the bleed resistances G shown in FIG. 8*b*.

The left hand half of FIG. 11 illustrates an alternative to the modification illustrated in the right hand half of FIG. 11, which alternative modification would also be appropriate for the FIG. 8 embodiment of seal assembly. In the left hand FIG. 11 arrangement, seven of the channels 12 do not extend radially inwardly sufficiently as to link with the distribution groove J. Consequently, for these seven channels 12 there is a barrier that will diminish the flow of gas from the circumferential periphery of the seal to its distribution groove J as a result of these seven depressions 12 being barred.

The kind of undulations illustrated at 11 and at 12 in FIG. 11 themselves provide the necessary bleeds from the high pressure side of a seal to its distribution grooves and therefore their useful application is limited to seals generally of the type illustrated by FIG. 8. If applied to seals of the type illustrated by FIG. 7 then the bleeds via channels G and K would become unwanted and such applications are therefore disadvantageous. However if the advantages listed previously of seals of the type illustrated by FIG. 7 are to be retained then if the depth from crest to trough of the undulations were no greater than would be the gap h in their absence at the design point of the seal, then the undulations become subsumed in the gap h. They add nothing to the bleed of gas from the high-pressure side of a seal to its distribution grooves i.e. that essential bleeds remains the bleeds via channels G and H.

A further property of the multiplicity of depressions illustrated on the right hand side of FIG. 11 is that they themselves in the absence of distribution grooves J produce pressures resulting in a moment resisting the inclination of the active faces of a seal relative to one another. The arcuate distribution grooves could then be omitted without disadvantage.

As mentioned above, depressions may be formed in the surface of a seal member by etching.

Figure 12A:
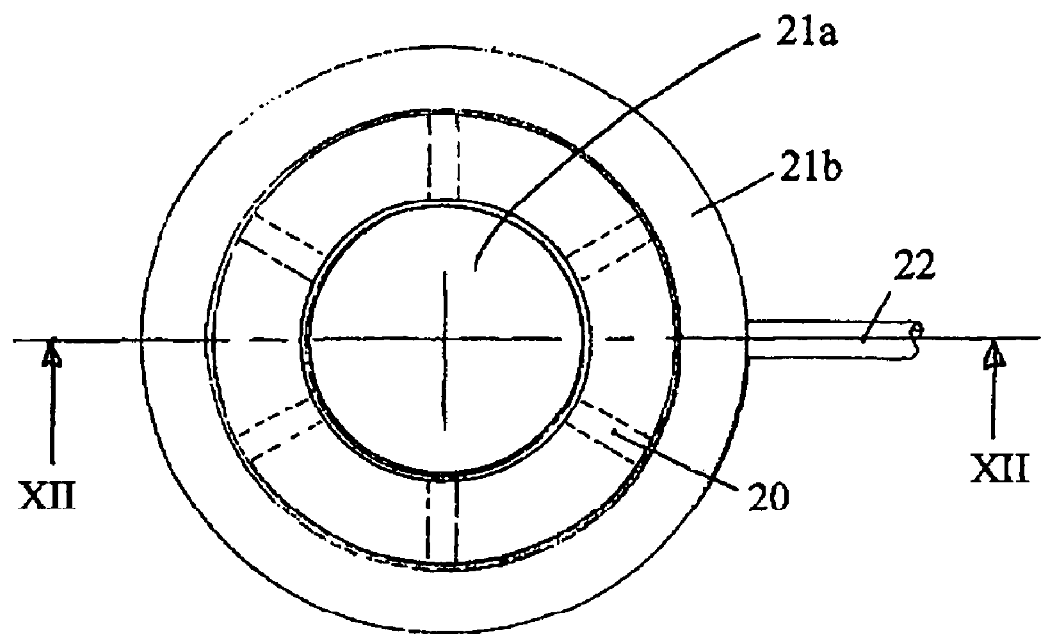
FIG. 12*a* is a schematic top hand view of a means for producing undulation in the front face of a member, such as the member of FIG. 10*a* and FIG. 10*b*.
Figure 12B:
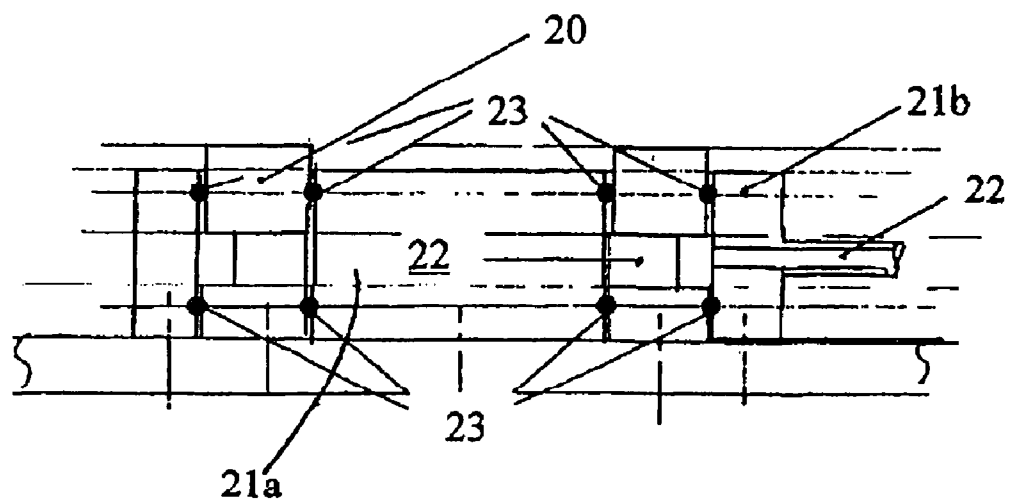
FIG. 12*b* is a sectional side elevation along the line of XII—XII in FIG. 12*a.*

FIGS. 12*a* and 12*b* illustrate one way in which to provide the face of a seal member with a circumferential undulation, especially the seal member illustrated in FIG. 10. FIG. 12*a* is a schematic top plan view of a means for producing undulations in a seal member. FIG. 12*b* is a sectional side elevation along the line XII—XII in FIG. 12*a*. In FIGS. 12*a* and 12*b*, a seal member blank 20 is shown, which seal member blank might for example be used to produce the seal member illustrated in FIG. 10*a*. Reference numerals 21*a*, 21*b* denote, respectively, inner and outer portions of a vacuum chamber 21 which can be evacuated, or partially evacuated, through a pipe 22. Six upstands are provided within the chamber 21 to support the reverse or back face of the seal member, i.e. not the face which will be an active face in use. These upstands 22 are shown dotted in FIG. 12*a* because they are obscured beneath the blank 20. The upstands 22 are lapped so that their upper surfaces lie accurately in a plane. As can most clearly be seen from FIG. 12*b*, the blank 20 is radially interposed in an annular space between the inner and outer portions 21*a* and 2*bb* of the chamber 21 with the blank 20 positioned on the six upstands 22. Seal members in the form of O-rings 23 are provided to seal in between the inner and outer circumferential surfaces of the blank 20 and the inner and outer portions of the chamber 21*a*, 21*b*.

By evacuating or partially evacuating the chamber beneath the blank 20 the blank resting upon the upstands 22 will become distorted elastically in the six spans between adjacent upstands by the pressure difference generated across the blank. The upper face of the blank (which is to form the active face in use) now undulates. By lapping this upper face flat whilst the blank 20 is distorted and then releasing the vacuum or partial vacuum, the formerly flat upper face of the blank 20 will be left with undulations complementary to those produced initially by the pressure difference. By means well known in the art, the pressure difference may be calculated so as to produce undulations of a desired amplitude. The active surface will vary continuously, but is unlikely to have a surface varying strictly harmonically from its mean plane due to the method of production of the undulations.

If a pressure difference greater than one atmosphere is required to produce the desired amplitude of undulation, then the assembly of vacuum chamber 21 and blank 20 could be placed in a pressure vessel together with the means for lapping the upper (active) surface of the blank so that a pressure difference greater than one atmosphere can be established across the blank.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A gas seal assembly for sealing between a rotating shaft and a surrounding casing, the gas seal assembly comprising:

a pair of sealing members, of which a first sealing member is mounted for rotation with a rotating shaft and a second sealing member is secured to a casing, each of the first sealing member and the second sealing member having an active face adjacent to a gap between the members which gap constitutes a leakage path through a seal assembly, one of the members being arranged in use to be urged in a direction attempting to reduce a width of the gap so as to prevent escape of a processed gas from a high pressure side of the seal assembly to a low pressure side; and a gas bleed arrangement for allowing the processed gas from the high pressure side of the seal assembly to be admitted into the gap at a position radially between inner and outer diameters of the sealing members to create a gas pressure in the gap applying a force in a direction to increase the width of the gap, wherein the gas bleed arrangement includes a bleed channel passing axially through the first sealing member between the active face of the first sealing member and another face of the first sealing member opposite the active face, which bleed channel has an associated flow resistance and is dimensioned such that the gas pressure at a gap end of the bleed channel is reduced relative to the pressure of the processed gas at the high pressure side of the seal assembly and such that the gas pressure in the gap decreases as the gap width increases, wherein the first sealing member includes a front annular member and a rear annular member, a front surface facing the gap being formed on the front annular member, and a rear surface of the front annular member facing a front surface of the rear annular member, a radially extending portion of the bleed channel being formed in one or both of the front surface of the rear member and the rear surface of the front member.

2. The gas seal assembly of claim 1, wherein the gap is a few micrometers.

3. The gas seal assembly of claim 1, wherein the second sealing member is biased by a spring in a direction tending to close the gap.

4. The gas seal assembly of claim 3, further comprising a seal ring for sealing between the second sealing member and the casing.

5. The gas seal assembly of claim 1, wherein the bleed channel co-operates with a formation in the active face to distribute a gas bleed over the active face.

6. The gas seal assembly of claim 5, wherein the formation comprises a generally circumferential groove provided in the active face.

7. The gas seal assembly of claim 1, wherein at least one active face defining the gap is provided with at least three pressure distribution formations each separately connectable via a respective bleed channel with a high pressure region on one side of the seal assembly so that in the event that the active face of the two members becomes non-parallel in use a force will be generated tending to return the active face of the two members to a parallel condition.

8. The gas seal assembly of claim 7, wherein each of the three pressure distribution formations comprises a generally arcuate groove provided in the active face.

9. The gas seal assembly of claim 8, wherein the pressure distribution formations are spaced apart generally and symmetrically about a circumference of at least one member.

10. The gas seal assembly of claim 1, wherein the processed gas is at least one of:

a natural gas;

a petroleum gas;

carbon dioxide; and an anesthetic gas.

* * * * *